United States Patent
Sobu et al.

(10) Patent No.: US 9,561,728 B2
(45) Date of Patent: Feb. 7, 2017

(54) POWER CONVERSION DEVICE

(71) Applicant: Hitachi Automotive Systems, Ltd., Hitachinaka-shi, Ibaraki (JP)

(72) Inventors: Yuji Sobu, Hitachinaka (JP); Mikito Komatsu, Hitachinaka (JP); Tatsuya Nakazawa, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/893,392

(22) PCT Filed: Apr. 18, 2014

(86) PCT No.: PCT/JP2014/061001
§ 371 (c)(1),
(2) Date: Nov. 23, 2015

(87) PCT Pub. No.: WO2014/199725
PCT Pub. Date: Dec. 18, 2014

(65) Prior Publication Data
US 2016/0114691 A1    Apr. 28, 2016

(30) Foreign Application Priority Data
Jun. 10, 2013  (JP) .................. 2013-121409

(51) Int. Cl.
*B60L 11/18*  (2006.01)
*H02J 7/00*  (2006.01)
(Continued)

(52) U.S. Cl.
CPC .......... *B60L 11/1816* (2013.01); *B60L 3/0069* (2013.01); *B60L 3/04* (2013.01);
(Continued)

(58) Field of Classification Search
CPC .................................... H01R 13/641
(Continued)

(56) References Cited

U.S. PATENT DOCUMENTS

4,454,381 A    6/1984  Ito et al.
5,997,344 A  * 12/1999  Shinozaki .......... H01R 13/5213
                                                      439/188

(Continued)

FOREIGN PATENT DOCUMENTS

| CN | 101114767 A | 1/2008 |
| JP | H11-127527 | 5/1999 |

(Continued)

OTHER PUBLICATIONS

International Search Report (PCT/ISA/210) issued in counterpart PCT Application No. PCT/JP2014/061001 dated Jul. 22, 2014 with English-language translation (two (2) pages).

(Continued)

*Primary Examiner* — Ross Gushi
(74) *Attorney, Agent, or Firm* — Crowell & Moring LLP

(57) ABSTRACT

To effectively suppress radiation and mixture of noise superimposed on a power line into a connection detection line. A power conversion device includes a connector having a wiring line which transmits DC power; and a housing in which the connector is arranged. The connector has a connection detection wiring line which detects whether the connector is connected with an external circuit. An opening part which connects with the connector is formed in the housing. An annular core formed of a magnetic substance is inserted through the opening part. The annular core is an annular member formed with a through-hole. The wiring line and the connection detection wiring line are introduced into an inside of the housing through the through-hole of the annular core.

5 Claims, 10 Drawing Sheets

(51) Int. Cl.
- *H01R 13/6591* (2011.01)
- *B60L 3/00* (2006.01)
- *B60L 3/04* (2006.01)
- *B60R 16/02* (2006.01)
- *H01R 13/703* (2006.01)

(52) U.S. Cl.
CPC ......... *B60L 11/185* (2013.01); *B60L 11/1818* (2013.01); *B60L 11/1824* (2013.01); *B60L 11/1846* (2013.01); *H01R 13/6591* (2013.01); *H02J 7/0009* (2013.01); *B60L 2210/10* (2013.01); *B60R 16/0222* (2013.01); *H01R 13/7039* (2013.01); *Y02T 10/7005* (2013.01); *Y02T 10/7072* (2013.01); *Y02T 10/7216* (2013.01); *Y02T 90/121* (2013.01); *Y02T 90/127* (2013.01); *Y02T 90/128* (2013.01); *Y02T 90/14* (2013.01); *Y02T 90/169* (2013.01); *Y04S 30/14* (2013.01)

(58) Field of Classification Search
USPC ........................................................ 439/489
See application file for complete search history.

(56) References Cited

U.S. PATENT DOCUMENTS

| | | | | |
|---|---|---|---|---|
| 2001/0006363 A1* | 7/2001 | Kawato | ................ | H05K 9/0018 333/182 |
| 2005/0208798 A1 | 9/2005 | Shimoda | | |

FOREIGN PATENT DOCUMENTS

| | | |
|---|---|---|
| JP | 2001-185891 A | 7/2001 |
| JP | 2011-15579 A | 1/2011 |
| JP | 2012-178937 A | 9/2012 |

OTHER PUBLICATIONS

Chinese Office Action dated Dec. 5, 2016 with English-language translation.

* cited by examiner

VEHICLE SIDE ← → DEVICE SIDE

POWER CONVERSION DEVICE

TECHNICAL FIELD

The present invention relates to a power conversion device, and particularly relates to a power conversion device mounted on an automobile which obtains driving power from an electric motor.

BACKGROUND ART

An automobile which obtains driving power from an electric motor (a so-called electric vehicle or hybrid vehicle) includes a high voltage storage battery for driving the electric motor used as the power and a low voltage storage battery for operating auxiliary machinery, such as a light or a radio of the vehicle. A power conversion device which performs power conversion from the high voltage storage battery to the low voltage storage battery or power conversion from the low voltage storage battery to the high voltage storage battery (a DC-DC converter device) is mounted on such a vehicle. It should be noted that the DC-DC converter device is either a device stored in an independent housing or a device stored in the same housing as another device necessary for the vehicle (e.g., an inverter device for driving the electric motor).

Generally, the DC-DC converter device has a circuit which converts from a DC high voltage power supply supplied from a vehicle side to a DC low voltage power supply (or converts from the DC low voltage power supply supplied from the vehicle side to the DC high voltage power supply) (PTL 1). In such a DC-DC converter, the DC high voltage power supply supplied from the vehicle side passes through a power transmission line and is supplied to the DC-DC converter device via a high voltage dedicated connector. Generally, mainly for safety reasons, this high voltage dedicated connector is provided with a connection detection line capable of detecting whether the connector is reliably engaged in terms of a circuit.

CITATION LIST

Patent Literature

PTL 1: JP 2012-178937 A

SUMMARY OF INVENTION

Technical Problem

Incidentally, the connection detection line provided in the connector for a high voltage line is arranged for determining whether the high voltage power line is normally engaged in a connector part. Accordingly, a contact terminal of the high voltage power line and a contact terminal of the connection detection line are formed close to each other in the connector part. In this configuration, the connection detection line must be configured to run adjacently parallel to and at a close distance from the high voltage power line in the connector part for a high voltage line. As a result, there is a possibility that noise superimposed on the high voltage power line is radiated to the connection detection line by space propagation.

In consideration of such a problem, an object of the present invention is to effectively suppress radiation and mixture of noise superimposed on a power line into a connection detection line.

Solution to Problem

A power conversion device according to the present invention includes: a connector having a wiring line which transmits DC power; and a housing in which the connector is arranged, and the connector has a connection detection wiring line which detects whether the connector is connected with an external circuit, an opening part which connects with the connector is formed in the housing, an annular core formed of a magnetic substance is inserted through the opening part, the annular core is an annular member formed with a through-hole, and the wiring line and the connection detection wiring line are introduced into an inside of the housing through the through-hole of the annular core.

Advantageous Effects of Invention

According to the present invention, noise itself superimposed on a power line is reduced, and radiation and mixture of the noise superimposed on the power line into a connection detection line can be effectively suppressed.

DESCRIPTION OF EMBODIMENTS

A power conversion device according to the present invention will be hereinafter described with reference to the drawings. It should be noted that identical reference signs are used to designate identical components in the respective drawings and overlapping description thereof is omitted.

Figure 1:
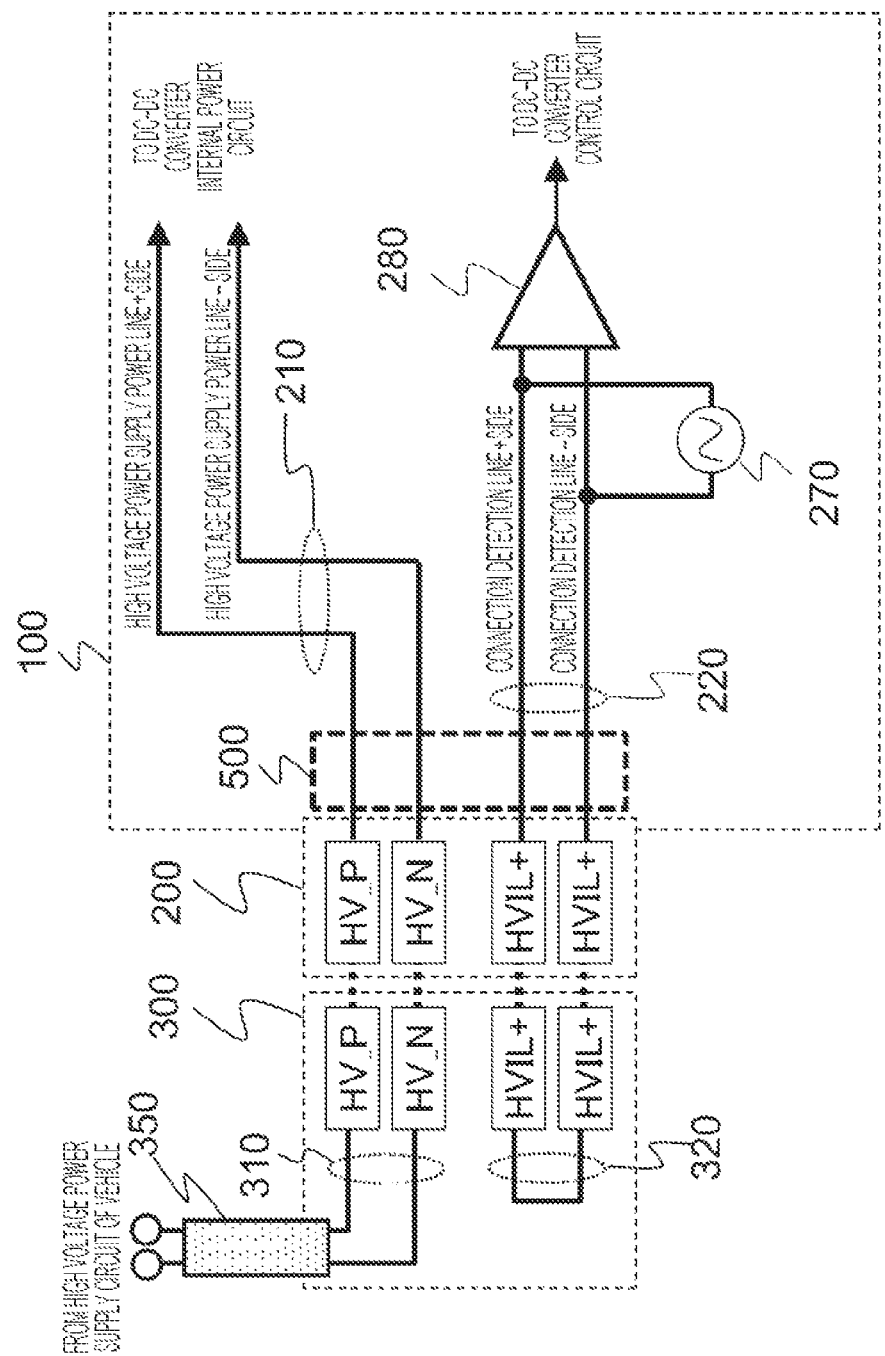
FIG. 1 is a circuit configuration diagram example of a high voltage power supply power line and a connection detection line in a DC-DC converter of a present embodiment.

FIG. 1 is an example of a circuit configuration diagram of a high voltage power supply power line and a connection detection line in a high voltage connector part of a DC-DC converter device 100 of a present embodiment. It should be noted that, in the following description, the DC-DC converter is described as an example and that the present invention is also applicable to the other power conversion device in which the power line and the connection detection line are included in the same connector. Further, in the present embodiment, the high voltage connector is described as a typical example, and the present invention does not depend on a state of the voltage.

The aforementioned high voltage connector is configured by a vehicle side connector 300 and a device side connector 200. As with the circuit configuration diagram example in FIG. 1, a high voltage power supply having hundreds of volts and supplied from the vehicle side passes through a high voltage power supply power wiring line 310 within a high voltage power supply wiring cable 350 and reaches the vehicle side connector 300. The DC-DC converter device 100 is provided with the device side connector 200 engaging with the vehicle side connector 300. The device side connector 200 and a DC-DC converter internal power circuit are connected by a high voltage power supply power line 210. When both the vehicle side connector 300 and the device side connector 200 are normally engaged, a high voltage power supply circuit is connected with the DC-DC converter internal power circuit, and high voltage power is supplied.

Further, as with FIG. 1, a plurality of connection detection lines 220, 320 for detecting an engaged state of the high voltage connector is provided inside this high voltage connecter. The connection detection lines 220, 320 in FIG. 1 are the simplest examples, use two-terminal connection detection lines, and are formed according to the following configuration. The connection detection line 320 of the vehicle side connector 300 has a configuration in which the two terminals are short-circuited by a wiring material, and on the other hand, a connection detection signal generation circuit 270 and a connection detection signal detection circuit 280 are provided in the device side connector 200 and an internal circuit (a control circuit or the like) side of the DC-DC converter device.

Here, when the vehicle side connector 300 and the device side connector 200 are normally engaged, the high voltage power supply power line 310 is connected with the high voltage power supply power line 210, and the connection detection line 320 is also connected with the connection detection line 220. Then, when the connection detection signal detection circuit 280 calculates and detects an electric signal state of the both terminals of the connection detection line 220, the DC-DC converter device 100 side can detect a connection state of the high voltage connector. It should be noted that the number of terminals or a circuit system used in the connection detection is not limited to the above and that any other system can be used as long as the system has an electrically detecting configuration.

Figure 2:
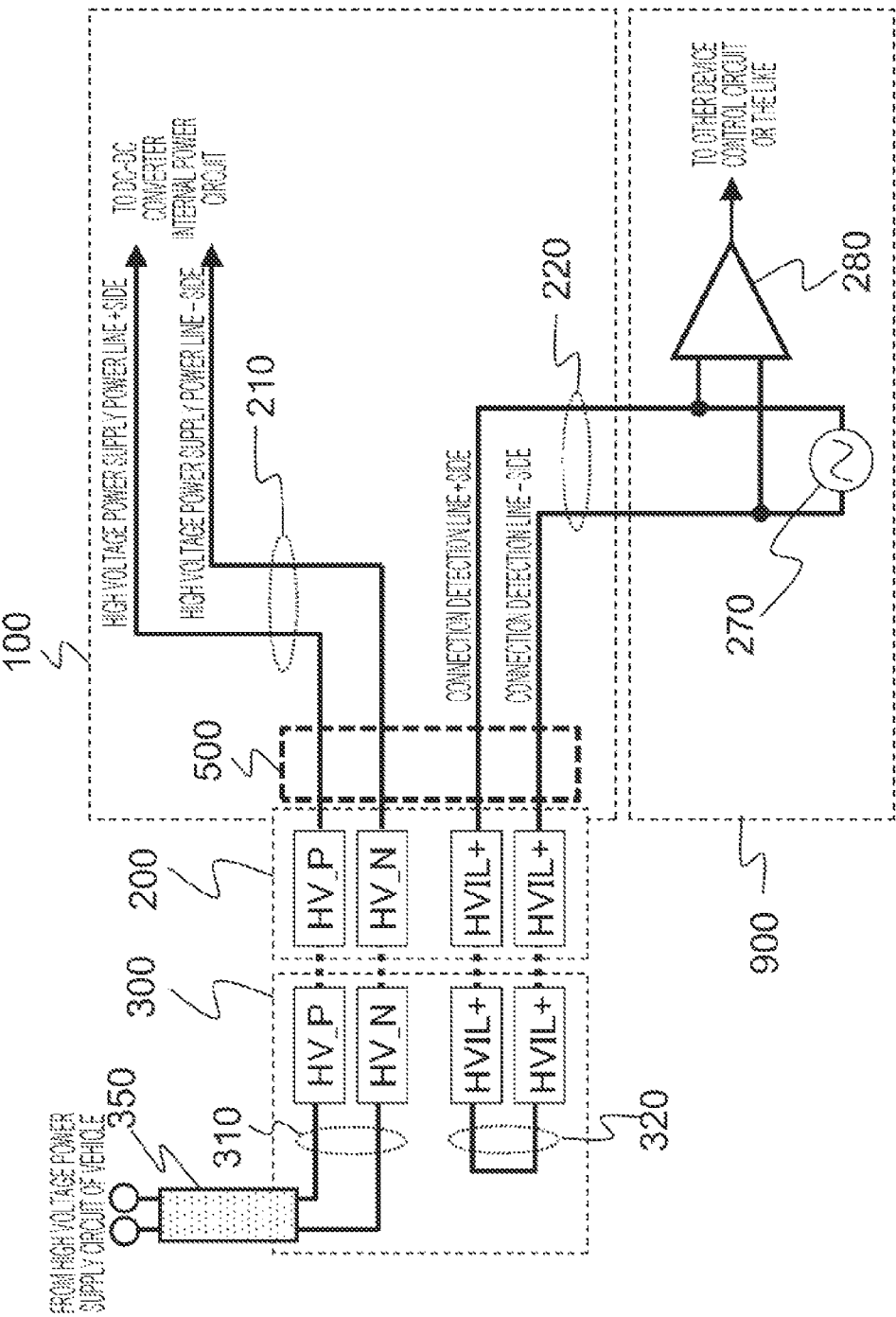
FIG. 2 is a circuit configuration diagram example of the high voltage power supply power line and the connection detection line in the DC-DC converter of the present embodiment, and is a configuration example different from that in FIG. 1.

FIG. 2 is another configuration example of the circuit configuration of the high voltage power supply power line and the connection detection line in the high voltage connector part of the DC-DC converter device 100. As with FIG. 1, the connection detection signal generation circuit 270 and the connection detection signal detection circuit 280 may be configured within the DC-DC converter device 100, to which the high voltage connecter is directly connected. However, as with FIG. 2, it is possible to have a configuration in which the connection detection line 220 is wired to a plurality of products and the connection detection signal generation circuit 270 and the connection detection signal detection circuit 280 are arranged in another device 900, to which the high voltage connector is not directly connected.

In FIGS. 1 and 2, the high voltage power supply power line 210 and the connection detection line 220 are introduced into the DC-DC converter device 100 from the device side connector 200. In the power conversion device of the present embodiment, an annular core member 500 is arranged in the introduction part. Hereinafter, the circuit configuration in FIG. 1 will be described in detail by using the drawings.

Figure 3A:
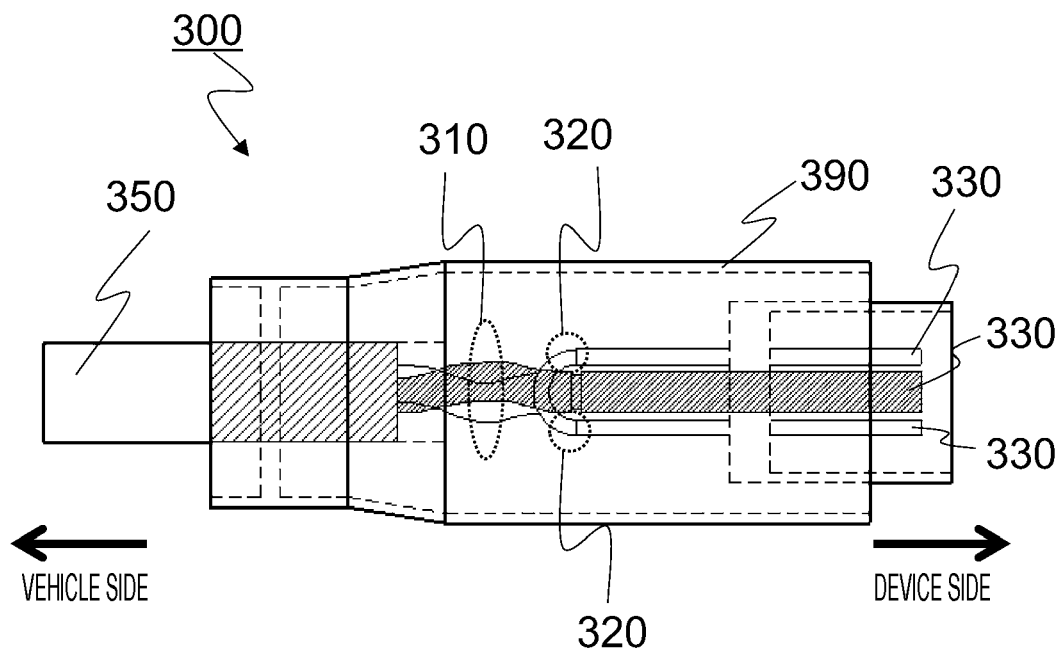
FIG. 3A is a configuration example of a vehicle side connector 300 employing the circuit configuration in FIG. 1.
Figure 3B:
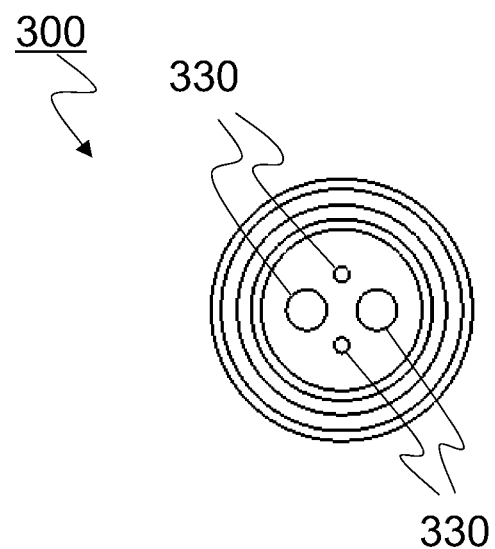
FIG. 3B is a view of the vehicle side connector 300 as viewed in a direction different from that in FIG. 3A.

FIGS. 3(a) and 3(b) are a configuration example of a vehicle side connector 300 employing the circuit configuration in FIG. 1. FIG. 3(a) is a side view of the vehicle side connector 300. FIG. 3(b) is a side view of the vehicle side connector 300 as viewed from the DC-DC converter device 100 side.

The vehicle side connector 300 connects and engages the high voltage power supply wiring cable 350, which is connected with the high voltage power supply circuit of the vehicle, with the device side connector 200 installed on the DC-DC converter device 100 side. The vehicle side connector 300 has a function of collectively connecting a plurality of electric circuits.

Inside the connector, the vehicle side connector 300 includes the two high voltage power supply power wiring lines 310, the two connection detection lines 320, and contact terminals 330 to which the respective wiring lines are connected. Here, the contact terminals 330 are fitted to contact terminals 230 of the device side connector 200, which will be described below, thereby forming electrical connection.

One end of each of the high voltage power supply power wiring lines 310 is wired to the contact terminal 330, and another end thereof is wired to the high voltage power supply circuit on the vehicle side. Both ends of the connection detection line 320 are wired to the one contact terminal 330. Therefore, the four contact terminals 330 are provided within the vehicle side connector 300.

These high voltage power supply power wiring lines 310, connection detection lines 320, and contact terminals 330 are stored within a cylindrical conductive metal connector outer shell 390. Here, in the present embodiment, the connection detection line 320 is wired shortest by a wiring material which is not particularly subjected to shield processing or the like.

Figure 4A:
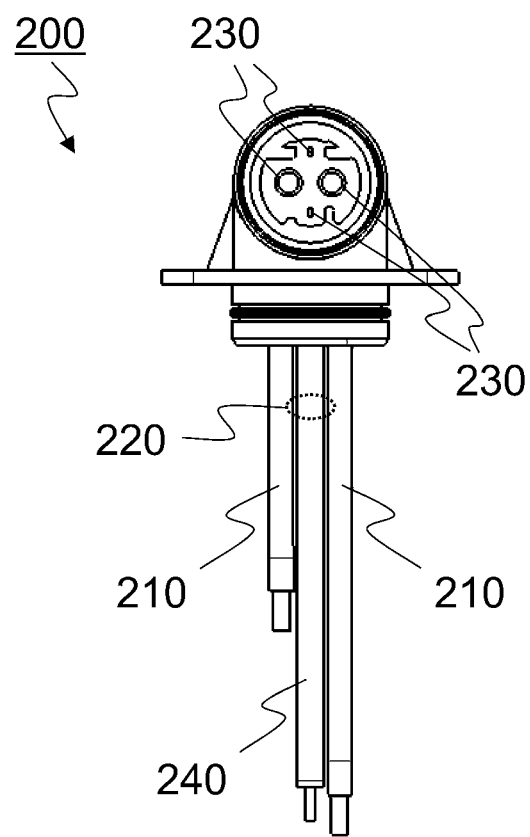
FIG. 4A is a configuration example of a device side connector 200 employing the circuit configuration in FIG. 1.
Figure 4B:
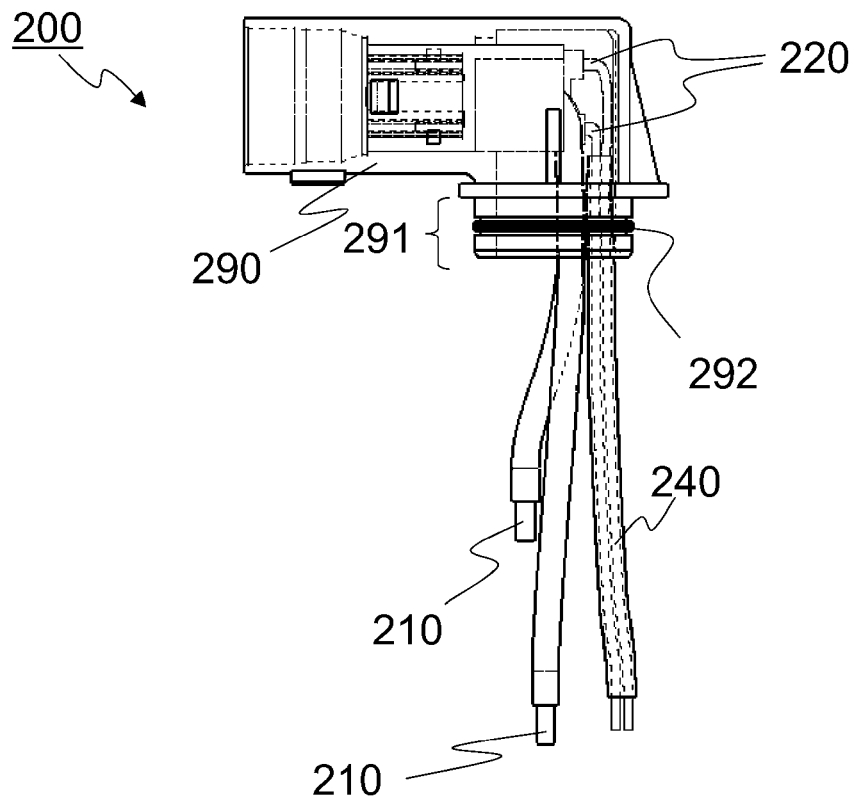
FIG. 4B is a view of the device side connector 200 as viewed in a direction different from that in FIG. 4A.
Figure 4C:
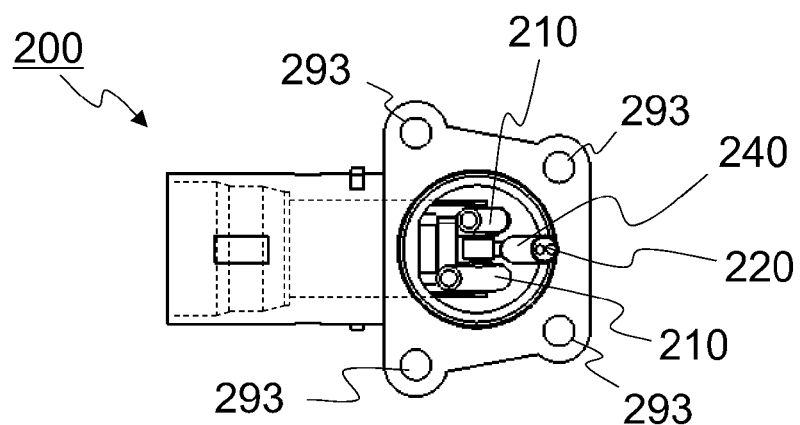
FIG. 4C is a view of the device side connector 200 as viewed in a direction further different from that in FIG. 4C.

FIGS. 4(a) to 4(c) are a configuration example of the device side connector 200 employing the circuit configuration in FIG. 1. FIG. 4(a) is a side view of the device side connector 200 as viewed in a fitting direction with the vehicle side connector 300. FIG. 4(b) is a side view of the device side connector 200. FIG. 4(c) is a side view of the device side connector 200 as viewed from an inside of the DC-DC converter device.

The device side connector 200 connects and engages with the vehicle side connector 300, and has a function of collectively connecting the plurality of electric circuits wired to the vehicle side connector 300 and a plurality of electric circuits introduced into the inside of the DC-DC converter device 100.

Inside the connector, the device side connector 200 includes the two high voltage power supply power lines 210, the two connection detection lines 220, and the contact terminals 230 to which the respective wiring lines are connected. Here, the contact terminals 230 are fitted to the contact terminals 330 of the aforementioned vehicle side connector 300, thereby forming electrical connection.

One end of each of the high voltage power supply power lines 210 is wired to the contact terminal 230, and another end thereof is wired to the internal power circuit (not illustrated) of the DC-DC converter device. One end of each of the connection detection lines 220 is wired to the contact terminal 230, and another end thereof is wired to the control circuit (not illustrated) side of the DC-DC converter device. In the present embodiment, since the two high voltage power supply power lines 210 and the two connection detection lines 220 are provided, the four connection terminals 230 are provided.

These high voltage power supply power lines 210, connection detection lines 220, and connection terminals 230 are stored within a cylindrical conductive metal connector outer shell 290. The conductive metal connector outer shell 290 is formed into a shape which engages and connects with the conductive metal connector outer shell 390 of the vehicle side connector, and is electrically connected therewith. This configuration is provided so as to achieve a noise shielding effect by potential of a housing in a connector engagement and connection part, and is not essential.

It should be noted that, in the present embodiment, the connection detection line 220 is wired by a wiring material which is not particularly subjected to shield processing or the like. However, a twisted wire or a shielded wire may be used for the connection detection line 220. Further, in the illustrated example, the connection detection line 220 is inserted through a tube 240 to collect the plurality of wires or to physically protect the wires. However, this is not necessarily required.

The conductive metal connector outer shell 290 of the device side connector 200 is provided with a plurality of holes 293 for screwing which fixedly holds the conductive metal connector outer shell 290 in the housing of the DC-DC converter device, a cylindrical housing introduction part 291, and an O-ring 292 which prevents intrusion of water or the like from this cylindrical housing introduction part 291 to an inside of the housing.

Figure 5:
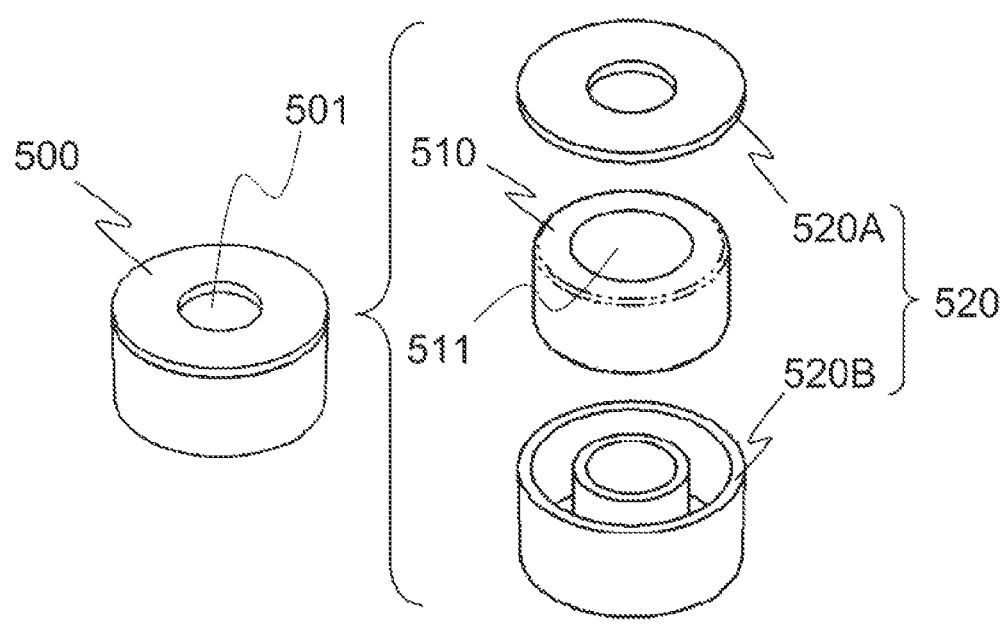
FIG. 5 is a configuration example of an annular core member 500.

FIG. 5 is a configuration example of the annular core member 500. The annular core member 500 is configured by an annular magnetic substance core 510 formed of a magnetic substance and an exterior member 520. The annular magnetic substance core 510 is an annular member formed with a through-hole 511. The exterior member 520 is an insulating member that covers an outer periphery of the annular magnetic substance core 510.

A ring-shaped core having an outer shape similar to that of the cylindrical housing introduction part 291 in FIG. 4(b) is used for the annular magnetic substance core 510 used in the present embodiment. However, the outer shape is not particularly limited as long as the core shape is annular. The outer shape may be appropriately selected in consideration of a shape of the housing introduction part 291 of the device side connector 200, machinability of a housing 101 of the DC-DC converter device 100, or the like.

The periphery of the annular magnetic substance core 510 is configured by the exterior member 520 for electrically insulating a core material. In the illustrated example, the exterior member 520 is configured by two exterior members 520A and 520B. However, the exterior member 520 is not limited to the illustrated example. The exterior member 520 may employ another method (e.g., a method, such as resin coating or insulating film coating) as long as the annular magnetic substance core 510 can be insulated. It should be noted that, since there is a case where the insulation itself is not required depending on the core material (e.g., a Ni—Zn based core material), the exterior member 520 itself is not essential.

Figure 6:
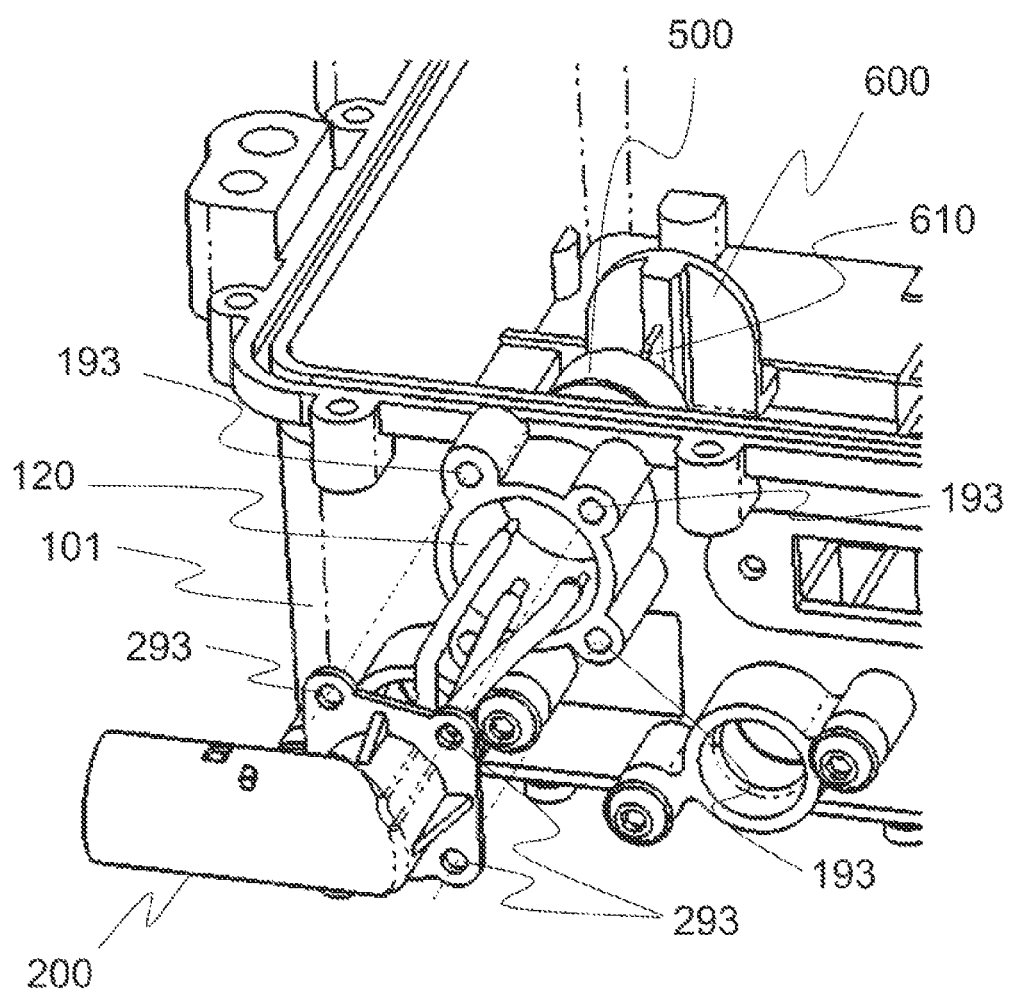
FIG. 6 is an example of incorporating the device side connector 200 and a housing 101.

FIG. 6 is an example of incorporating the device side connector 200 and the housing 101. The housing 101 is provided with a screw hole 193 for fixedly holding the device side connector 200 and an opening part (a mounting/wiring hole) 120 which matches the shape of the housing introduction part 291 of the device side connector 200. The device side connector 200 is mounted and fixed to the opening part 120 in an outside direction of the housing 101.

In order to mount and fix the device side connector 200, the housing 101 is formed with a mounting part protruded from an outer wall surface of the housing 101. The mounting part protrudes from the outer wall surface of the housing 101 to form the screw hole 193 and to secure a contact between the O-ring 292 provided in the hosing introduction part 291 of the device side connector 200 and an inner wall of the opening part 120. Further, a storage depth of the annular core member 500 stored in the opening part 120 is secured by protruding from the outer wall surface of the housing 101. Further, mounting of the vehicle side connector 300 becomes easy, and assembling ability improves.

The device side connector 200 is mounted to the housing 101 by causing a screw to pass through the screw hole 293 formed in the device side connector 200 and the screw hole 193 formed in the housing 101. The conductive metal connector outer shell 290 of the device side connector 200 is connected at the same potential as the housing 101 by being directly fixed to the housing 101.

On the other hand, as will be described below in FIGS. 7(a), 7(b), and 8, the annular core member 500 and a partition member 600 are mounted on an opposite side of the device side connector 200 with the housing 101 in between, i.e., inside the housing 101.

Figure 7A:
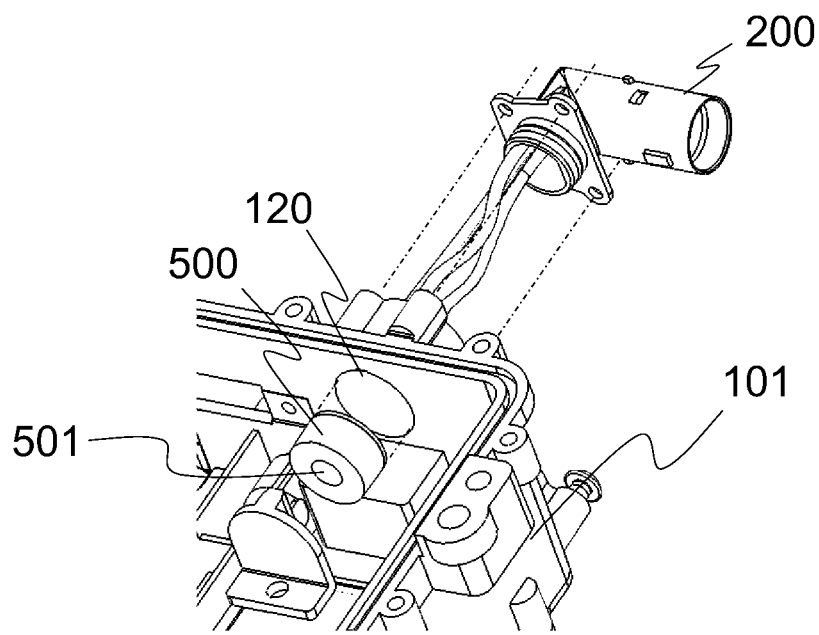
FIG. 7A is a perspective view illustrating a configuration example of incorporating the device side connector 200 and the annular core member 500 into the housing 101.
Figure 7B:
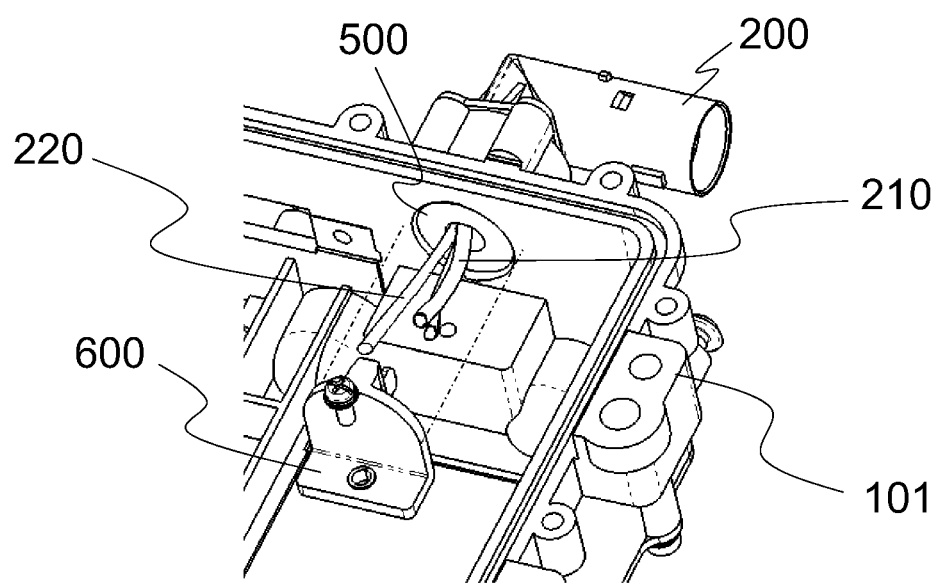
FIG. 7B is a perspective view illustrating a configuration example of incorporating a partition member 600 into the housing 101.

FIG. 7(a) is a perspective view illustrating a configuration example of incorporating the device side connector 200 and the annular core member 500 into the housing 101. FIG. 7(b) is a perspective view illustrating a configuration example of incorporating the partition member 600 into the housing 101.

As explained in FIG. 6, the device side connector 200 is mounted to the opening part 120 formed in the housing 101. On the other hand, as illustrated in FIG. 7(a), the annular core member 500 is mounted to the opening part 120 from the inside of the housing 101. Then, the high voltage power supply power wiring line 210 of the device side connector 200 and the connection detection line 220 are introduced into the inside of the housing 101 through a through-hole 501 formed in the annular core member 500.

A shape of the opening part 120 inside the housing 101, to which the annular core member 500 is mounted, is machined of course so as to match an outer shape of the annular core member 500, and the annular core member 500 is stored into the wall surface of the housing. In the example illustrated in FIG. 7(b), the entire annular core member 500 is configured to be stored into the wall surface of the housing. However, it may be configured that the entire annular core member is not stored and a portion of the annular core member protrudes.

By configuring in this way, the high voltage power supply power wiring line 210 and the connection detection wiring line 220 of the device side connector 200 pass through the through-hole 501 of the annular core member 500. Accordingly, the high voltage power supply power wiring line 210 and the connection detection wiring line 220 function as common mode choke coils to the respective wiring circuits, and a filter circuit for suppressing common mode noise can be configured. In other words, as illustrated in FIG. 1 or FIG. 2, the high voltage power supply power wiring line 210 and the connection detection wiring line 220 are respectively arranged in circuit boards inside the DC-DC converter device 100. By causing these wiring lines to collectively pass through the annular core member 500, common mode noise superimposed on the wiring lines can be removed at a place near a point where the noise is mixed.

Further, the annular core member 500 of the present embodiment is stored in the opening part 120 of the housing 101. Accordingly, the above-described function can be realized without increasing a size of the wiring part.

Figure 8:
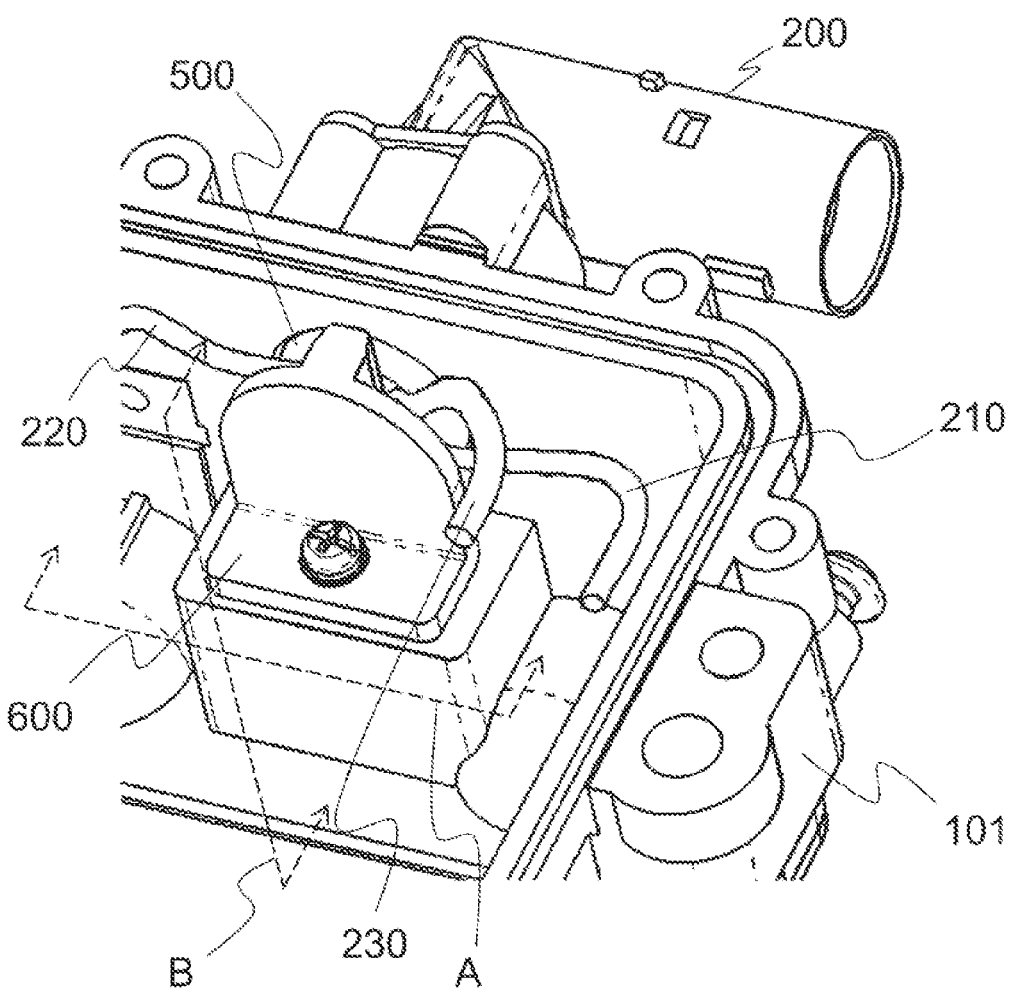
FIG. 8 is a perspective view illustrating a configuration example of incorporating the partition member 600 into the housing 101.

FIG. 8 is a perspective view illustrating a configuration example of incorporating the partition member 600 into the housing 101. As illustrated in FIG. 7(b), the partition member 600 is arranged at a position facing the annular core member 500 in a state in which the annular core member 500 is inserted through the opening part 120 of the housing 101. The partition member 600 is fixed to the housing 101 in a state in which the annular core member 500 is held and fixed to the housing 101. For example, as illustrated in FIG. 8, a method of fixing the partition member 600 to the housing 101 includes a method of fastening with a screw or the like.

Figure 9A:
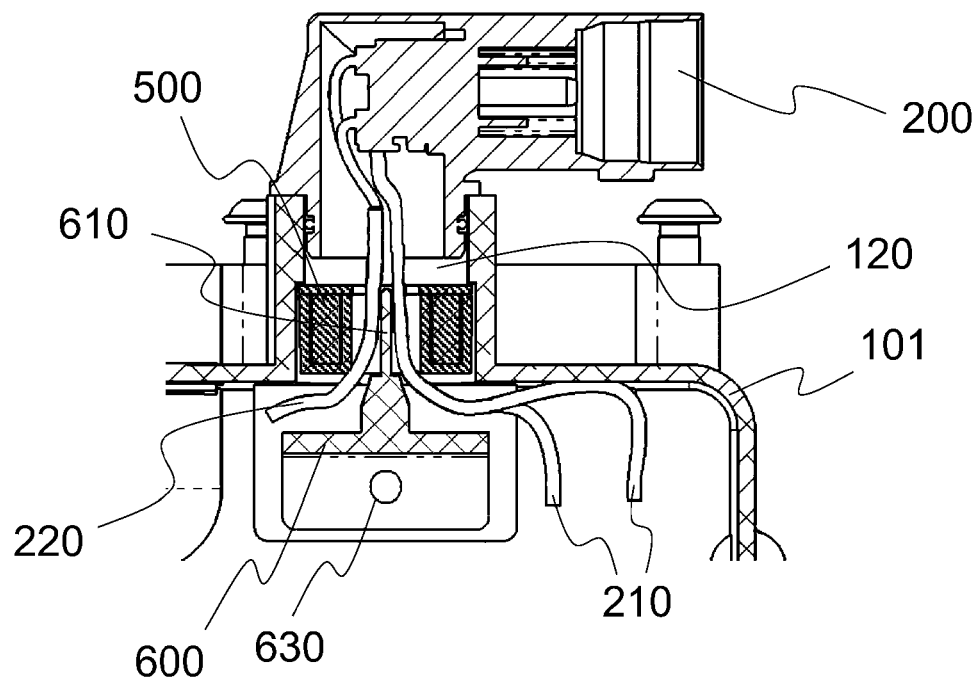
FIG. 9A is a top sectional view taken along a section A in FIG. 8.
Figure 9B:
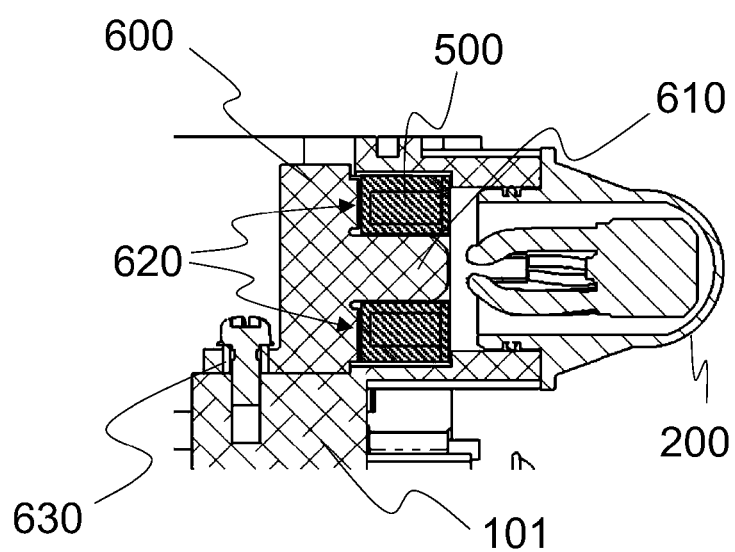
FIG. 9B is a side sectional view taken along a section B in FIG. 8.

FIG. 9(a) is a top sectional view taken along a section A in FIG. 8. FIG. 9(b) is a side sectional view taken along a section B in FIG. 8.

The partition member 600 has a partition wall 610, a core fixing part 620, and a hole 630 for screwing. The hole 630 for screwing is used to fix the partition member 600 to the housing 101. When viewed in an axis direction of the through-hole 501, the core fixing part 620 is formed so that a region of the annular core member 500 other than a region in which the through-hole 501 is formed and a projection part of the core fixing part 620 are superimposed on each other.

Further, the core fixing part 620 is formed into a protruded sectional shape so as to press the annular core member 500 into the opening part 120 of the housing 101, and is configured so that a tip having the protruded sectional shape presses the annular core member 500 toward an outside of the housing 101. In other words, as illustrated in FIG. 9(b), at the tip having the protruded sectional shape, the core fixing part 620 fixedly holds the annular core member 500 by pressing the annular core member 500 in a wall surface direction of the housing 101. Accordingly, the annular core member 500 is sandwiched between the inner wall of the opening part 120 formed in the housing 101 and the core fixing part 620.

Further, as illustrated in FIG. 9(a), by blocking a portion of an opening of the through-hole 501, the core fixing part 620 divides the opening region into a region on one side of the core fixing part 620 and a region on another side thereof. The high voltage power supply power wiring line 210 and the connection detection wiring line 220 which pass through the annular core member 500 are arranged so that the high voltage power supply power wiring line 210 is laid on the one side relative to the core fixing part 620 and the connection detection wiring line 220 is laid on the other side relative to the core fixing part 620.

In this way, in a state in which the partition member 600 is fixed to the housing 101, the core fixing part 620 is formed so as to suppress intersection of the high voltage power supply power wiring line 210 and the connection detection wiring line 220 in a wiring process after passing through the through-hole 501 of the annular core member 500. It should be noted that the shape does not necessarily need to be the protruded section. Any shape can be used as long as wiring intersection can be suppressed and the annular core member 500 can be fixed.

The partition wall 610 of the partition member 600 protrudes from a portion of the core fixing part 620 in the outside direction of the housing 101. The partition wall 610 protrudes into the through-hole 501 of the annular core member 500 fixedly held in the opening part 120 of the housing 101. With this configuration, a space of the through-hole 501 of the annular core member 500 is divided into a space on one side of the partition wall 610 and a space on another side thereof.

As illustrated in FIG. 9(a), the high voltage power supply power wiring line 210 is laid in the space on the one side, of the spaces within the through-hole 501 of the annular core member 500, relative to the partition wall 610. On the other hand, the connection detection wiring line 220 is laid in the space on the other side, of the spaces within the through-hole 501 of the annular core member 500, relative to the partition wall 610. In this way, the wiring intersection inside the through-hole 501 of the annular core member 500 can be suppressed by providing the partition wall 610 capable of dividedly arranging the high voltage power supply power wiring line 210 and the connection detection wiring line 220.

By configuring in this way, the high voltage power supply power wiring line 210 laid on a right side of the opening part 120 of the housing is also arranged on the right side within the through-hole 501 of the annular core member 500, and the connection detection wiring line 220 laid on a left side of the opening part 120 of the housing is also arranged on the left side within the through-hole 501 of the annular core member 500. Further, in a wiring lead-out part of the opening part 120 of the housing, the high voltage power supply power wiring line 210 is positioned so as to be directed in a right direction and the connection detection wiring line 220 is positioned so as to be directed in a left direction by the core fixing part 620 formed into the protruded sectional shape.

With this configuration, adjacent intersection between the high voltage power supply power wiring line 210 and the connection detection wiring line 220 after passing through the common mode filter is prevented, and a constant amount of space distance between the two wiring lines can be secured. Accordingly, noise mixture caused by space propagation can be suppressed.

It should be noted that in the above description, the core fixing part 620 and the partition wall 610 divide the space in the right and left direction. Naturally, the division direction is not limited to the right and left and should be changed according to a laying direction of the wiring lines. Further, the number of divided spaces is not necessarily limited to two, and may be changed according to the number of wiring lines. The shape of the wall surface is not essential as long as the partition shape is maintained.

It should be noted that the partition member 600 may be configured by an insulator or a conductor, or maybe configured by combining the insulator and the conductor. When the partition wall 610 and the core fixing part 620 having a protruded sectional shape of the partition member 600 are conductors and reference potential (GND potential), which is the same as that of the housing 101, is applied, the partition shaped part can obtain an electrical shielding effect. Accordingly, it is more effective to suppress noise mixture caused by the space propagation.

It should be noted that, in the present embodiment, the annular core member 500 is mounted from the inside of the housing 101. However, the annular core member 500 may be configured to be mounted from the outside of the housing 101. In other words, there is a method in which the annular core member 500 is inserted through the opening part 120 in the outside direction of the housing 101 before mounting the device side connector 200, and after that, the device side connector 200 is mounted. In this case as well, a similar effect can be obtained by coping with a partial change in the wall having a protruded sectional shape of the aforementioned partition member 600.

REFERENCE SIGNS LIST

100 DC-DC converter device
101 housing
120 opening part
193 screw hole
200 device side connector
210 high voltage power supply power wiring line
220 connection detection line
230 contact terminal
240 tube
270 connection detection signal generation circuit
280 connection detection signal detection circuit
290 conductive metal connector outer shell
291 housing introduction part
292 O-ring
293 hole for screwing
300 vehicle side connector
310 high voltage power supply power wiring line
320 connection detection line
330 contact terminal
350 high voltage power supply wiring cable
390 conductive metal connector outer shell
500 annular core member
501 through-hole
510 annular magnetic substance core
511 through-hole
520 exterior member
600 partition member
610 partition wall
620 core fixing part
630 hole for screwing
900 other device

The invention claimed is:

1. A power conversion device, comprising:
a connector having a wiring line which transmits DC power; and
a housing in which the connector is arranged,
wherein the connector has a connection detection wiring line which detects whether the connector is connected with an external circuit,
the connection detection wiring line is introduced into an inside of the housing through an inner peripheral side of an annular core formed of a magnetic substance, and
wherein a partition member is arranged between the wiring line and the connection detection wiring line, and the annular core is sandwiched between the housing and the partition member.

2. The power conversion device according to claim 1, wherein the wiring line which transmits the DC power is introduced into the inside of the housing through the inner peripheral side of the annular core.

3. The power conversion device according to claim 2, wherein an opening part which connects with the connector is formed in the housing, and
the annular core is inserted through the opening part.

4. The power conversion device according to claim 1, wherein the partition member has a core fixing part.

5. The power conversion device according to claim 1, wherein the partition member has a partition wall which protrudes to the inner peripheral side of the annular core, and
the wiring line and the connection detection wiring line are separated by the partition wall on the inner peripheral side of the annular core.

* * * * *